United States Patent
Jain et al.

(10) Patent No.: US 11,606,504 B2
(45) Date of Patent: Mar. 14, 2023

(54) METHOD AND ELECTRONIC DEVICE FOR CAPTURING ROI

(71) Applicant: Samsung Electronics Co., Ltd., Suwon-si (KR)

(72) Inventors: Nakul Jain, Noida (IN); Vinamra Gupta, Noida (IN); Manoj Kumar Garg, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 113 days.

(21) Appl. No.: 17/014,323

(22) Filed: Sep. 8, 2020

(65) Prior Publication Data

US 2021/0075970 A1    Mar. 11, 2021

(30) Foreign Application Priority Data

Sep. 10, 2019 (IN) .............................. 201941036427

(51) Int. Cl.
*H04N 5/232* (2006.01)
*H04N 13/25* (2018.01)
(Continued)

(52) U.S. Cl.
CPC ......... *H04N 5/23296* (2013.01); *G06V 10/25* (2022.01); *H04N 13/25* (2018.05); *H04N 21/23412* (2013.01); *H04N 21/4854* (2013.01)

(58) Field of Classification Search
CPC ................................................ H04N 5/23296
(Continued)

(56) References Cited

U.S. PATENT DOCUMENTS 9,769,388 B2   9/2017  Han
9,979,890 B2   5/2018  Bernstein et al.
(Continued)

FOREIGN PATENT DOCUMENTS

KR   10-2016-0094655 A   8/2016
KR   10-2019-0008610 A   1/2019
WO      2016/125946 A1   8/2016

OTHER PUBLICATIONS

Indian Office Action dated Apr. 15, 2021, issued in Indian Application No. 201941036427.

(Continued)

*Primary Examiner* — Joel W Fosselman
(74) *Attorney, Agent, or Firm* — Jefferson IP Law, LLP

(57) ABSTRACT

A method for capturing a region of interest (ROI) by an electronic device is provided. The method includes detecting a plurality of ROIs in a preview frame, captured in a field of view of a plurality of image sensors of the electronic device. Further, the method includes assigning at least one first ROI from the plurality of ROIs to the at least one first image sensor from the plurality of image sensors and at least one second ROI from the plurality of ROIs to at least one second image sensor from the plurality of image sensors. Further, the method includes capturing at least one first media content of the at least one first ROI using the at least one first image sensor and at least one second media content of the at least one second ROI using the at least one second image sensor. Further, the method includes storing the at least one first media content and the at least one second media content in the electronic device.

16 Claims, 16 Drawing Sheets

(51) Int. Cl.
*H04N 21/234* (2011.01)
*H04N 21/485* (2011.01)
*G06V 10/25* (2022.01)

(58) Field of Classification Search
USPC ...................................................... 348/222.1
See application file for complete search history.

(56) References Cited

U.S. PATENT DOCUMENTS

| | | |
|---|---|---|
| 10,038,841 B1 | 7/2018 | Davey |
| 2010/0002071 A1 | 1/2010 | Ahiska |
| 2015/0350554 A1 | 12/2015 | Koti et al. |
| 2017/0013179 A1 | 1/2017 | Kang et al. |
| 2017/0140791 A1 | 5/2017 | Das et al. |
| 2018/0270445 A1* | 9/2018 | Khandelwal ........... H04N 5/247 |
| 2019/0020823 A1 | 1/2019 | Jeon |
| 2019/0034756 A1 | 1/2019 | Kim et al. |
| 2019/0043220 A1 | 2/2019 | Kumar et al. |
| 2019/0050664 A1* | 2/2019 | Yang ....................... G06F 3/012 |
| 2019/0082101 A1 | 3/2019 | Baldwin et al. |

OTHER PUBLICATIONS

International Search Report dated Dec. 15, 2020, issued in International Application No. PCT/KR2020/012132.
Extended European Search Report dated Dec. 18, 2020, issued in European Application No. 20195320.5-1209.
European Office Action dated Jan. 2, 2023, issued in European Application No. 20 195 320.5.

* cited by examiner

FIG. 1
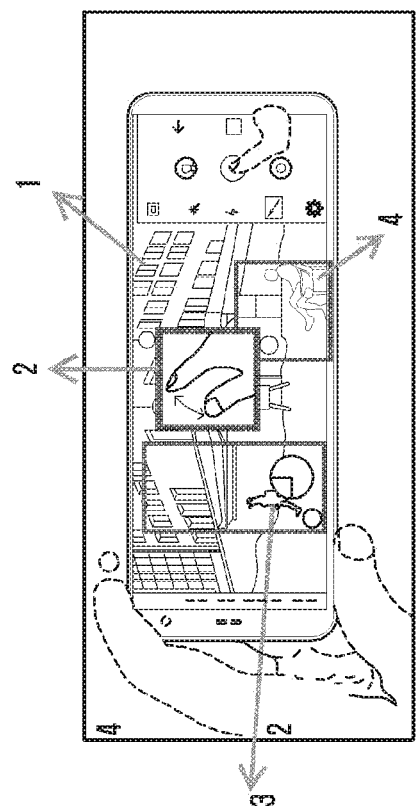
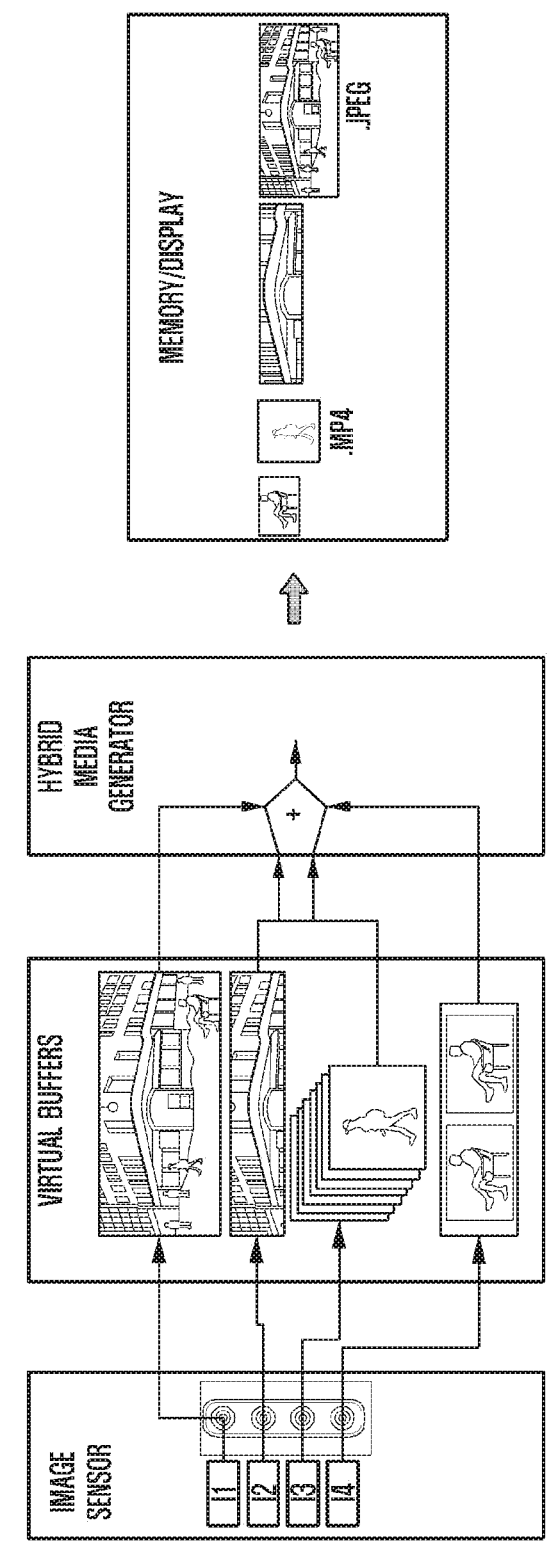

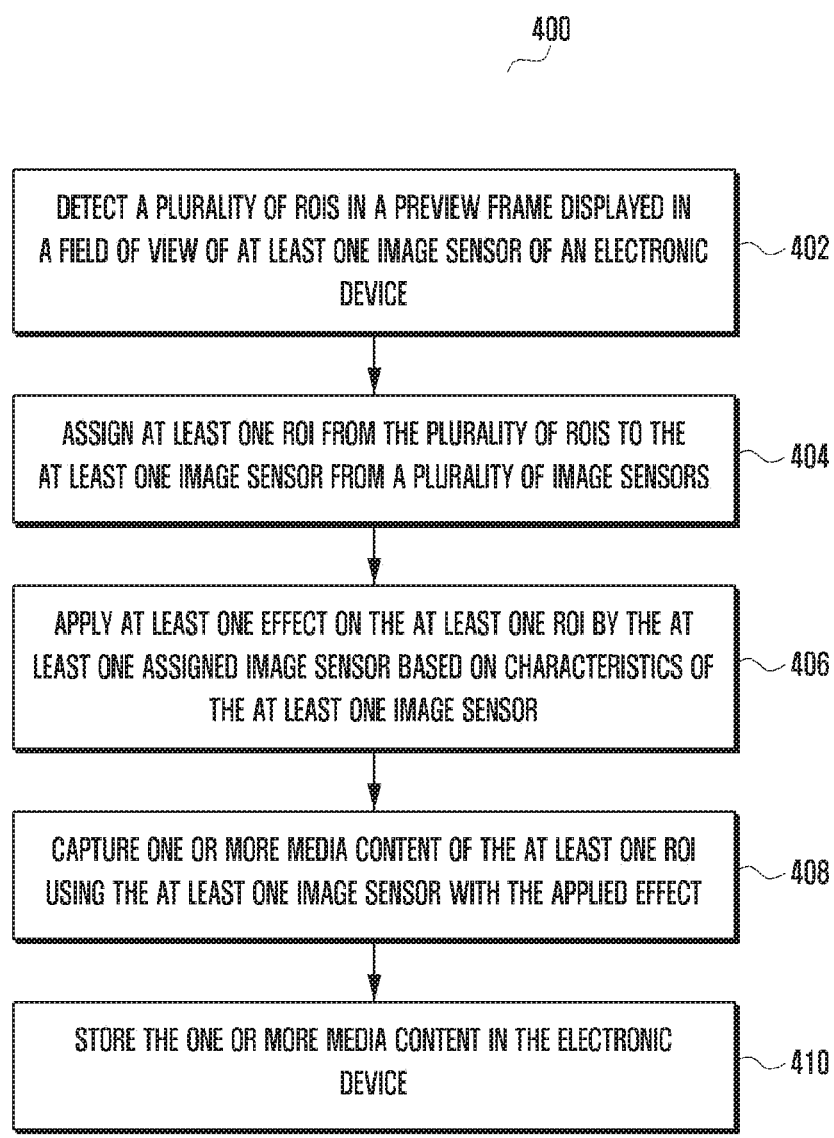

FIG. 9B

| | 1 | 2 | 3 | 4 | 5 | - - - | nth | - - - | xth |
|---|---|---|---|---|---|---|---|---|---|
| | $A_{0,0}$ | $A_{0,1}$ | $A_{0,2}$ | $A_{0,3}$ | $A_{0,4}$ | | $A_{0,n}$ | | $A_{0,x}$ |
| | $A_{1,0}$ | $A_{1,1}$ | $A_{1,2}$ | $A_{1,3}$ | $A_{1,4}$ | | $A_{1,n}$ | | $A_{1,x}$ |
| $I_3+I_4$ Combined Image | $A_{3,0}$ | $A_{3,1}$ | $F^n[A_{3,2}, B_{3,2}]$ | $F^n[A_{3,3}, B_{3,3}]$ | $F^n[A_{3,4}, B_{3,4}]$ | | $A_{3,n}$ | | $A_{3,x}$ |
| | | | | | | | | | |
| | | | | | | | | | |
| | $A_{m,0}$ | $A_{m,1}$ | $F^n[A_{m,2}, B_{m,2}]$ | $F^n[A_{m,3}, B_{m,3}]$ | $F^n[A_{m,4}, B_{m,4}]$ | | $A_{m,n}$ | | $A_{m,x}$ |

RoI's

FIG. 10

| Luminance Value (LV) | Distance Value (DV) | Motion Value (MV) | Image Sensor Group based on LV, DV & MV | Additional Image Sensor selection based on user input |
|---|---|---|---|---|
| 1 | 1 | 1 | I2, I3 | I4/ I1 |
| 1 | 1 | 0 | I2, I3 | I4/ I1 |
| 1 | 0 | 1 | I3 | I4/ I1/ I2 |
| 1 | 0 | 0 | I3 | I4/ I1/ I2 |
| 0 | 1 | 1 | I2, I3 | I4/ I1 |
| 0 | 1 | 0 | I2 | I4/ I1/ I3 |
| 0 | 0 | 1 | I3 | I4/ I1/ I2 |
| 0 | 0 | 0 | I1/ I3 | I4/ I2 |

FIG. 11

| S. NO | Illumination type | Exposure values |
|---|---|---|
| 1 | Lightning condition | 100 |
| 2 | Snow on a sunny day | 16 |
| 3 | Sunny day | 15 |
| 4 | Hazy, some clouds | 14 |
| 5 | Light clouds | 13 |
| 6 | Overcast, shade areas on a sunny day, sunrise and sunset | 12 |
| 7 | Just before sunrise and after sunset and blue hour | 9 to 11 |
| 8 | Bright street light and bright indoor lightning | 8 |
| 9 | Indoor lightning and bright window light | 5 to 7 |
| 10 | Dim window light | 2 to 4 |
| 11 | Dark morning before sunrise and dark evening after sunset | -1 to 1 |
| 12 | Moonlight from a full moon | -2 to -3 |
| 13 | Moonlight from a gibbous moon | -4 |
| 14 | Moonlight from a quarter moon and bright aurora | -5 to -6 |
| 15 | Stars and starlight | -7 to -8 |
| 16 | Milky way center | -9 to -11 |

METHOD AND ELECTRONIC DEVICE FOR CAPTURING ROI

CROSS-REFERENCE TO RELATED APPLICATION(S)

This application is based on and claims priority under 35 U.S.C. § 119(a) of an Indian patent application number 201941036427, filed on Sep. 10, 2020, in the Indian Patent Office, the disclosure of which is incorporated by reference herein in its entirety.

BACKGROUND

1. Field

The disclosure relates to an image processing system. More particularly, the disclosure relates to a method and electronic device for capturing a region of interest (ROI) in a scene.

2. Description of Related Art

In general, multiple cameras are widely included on an electronic device by various electronic device manufactures in order to provide various functionalities and different capabilities like wider viewing angle, telephoto, depth, etc. to a user. The user of the electronic device selects any one of the cameras manually based on the functionality of the camera and the type of content (e.g., image, video, or the like) desired by the user which the user is to capture from a field of view of the cameras. Further, the user usually captures multiple images of scenes. Those scenes are captured with different cameras and with different modes/format. However, there is no intuitive/intelligence mechanism that assists the user to perform multi-tasking while capturing multimedia content when multiple cameras are included in the electronic device.

In the electronic device, multiple image sensors (e.g., camera or the like) are being used to provide different photographic effects on the captured content from the field of view. The image sensors are being used individually to provide better picture quality and media with different effects, e.g., bokeh effect, three dimensional (3D) image, object tracking in image, depth adjustment, multiple focus, etc. In general, the multiple image sensors are hardcoded by an original equipment manufacturer (OEM) so only specific effects can be captured and cannot be implemented in a specific manner per user's choice to produce an output with an effect.

Further, there is no way in which the user can activate multiple cameras for a portion of scene as per his/her needs. In an example, while shooting within the field of view selecting a region and associating that region with an appropriate image sensor to apply an effect (e.g., "10 sec video" and based on an input storing that region as a 10 sec video file). Further, currently there is no way in which the electronic device can analyze the scene and intelligently detect the cameras with respect to objects in scene and camera characteristics. Furthermore, currently there is no way to preserve the multiple images captured from multiple cameras in different formats based on a single input.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and electronic device for capturing a region of interest (ROI).

Another aspect of the disclosure is to detect at least one of a scene and an object based on characteristics of a preview frame.

Another aspect of the disclosure is to detect a plurality of ROIs in a preview frame displayed in a field of view of at least one image sensor of the electronic device.

Another aspect of the disclosure is to determine at least one selection parameter based on at least one of a scene and an object in the at least one ROI.

Another aspect of the disclosure is to map the at least one selection parameter to at least one characteristic of at least one image sensor of the plurality of image sensors.

Another aspect of the disclosure is to assign at least one ROI from the plurality of ROIs to the at least one image sensor from a plurality of image sensors.

Another aspect of the disclosure is to apply at least one effect on the at least one ROI by the at least one assigned image sensor based on characteristics of the at least one image sensor.

Another aspect of the disclosure is to detect an input for media content capture in order to capture a first media content of the at least one ROI and a second media content of the plurality of ROIs.

Another aspect of the disclosure is to capture one or more media content of the at least one ROI using the at least one image sensor with the applied effect.

Another aspect of the disclosure is to assign at least one first ROI from the plurality of ROIs to at least one first image sensor from the plurality of image sensors and at least one second ROI from the plurality of ROIs to at least one second image sensor from the plurality of image sensors.

Another aspect of the disclosure is to capture at least one first media content of the at least one first ROI using the at least one first image sensor and at least one second media content of the at least one second ROI using the at least one second image sensor.

Another aspect of the disclosure is to store the one or more media content in the electronic device.

Another aspect of the disclosure is to display the one or more stored media content.

Additional aspects will be set forth in part in the description which follows and, in part, will be apparent from the description, or may be learned by practice of the presented embodiments.

In accordance with an aspect of the disclosure, a method for capturing ROI by an electronic device is provided. The method includes detecting a plurality of ROIs in a preview frame, captured in a field of view of a plurality of image sensors of the electronic device. Further, the method includes assigning at least one first ROI from the plurality of ROIs to at least one first image sensor from the plurality of image sensors and at least one second ROI from the plurality of ROIs to at least one second image sensor from the plurality of image sensors. Further, the method includes capturing at least one first media of the at least one first ROI using the at least one first image sensor and at least one second media of the at least one second ROI using the at least one second image sensor. Further, the method includes storing the at least one first media and the at least one second media in the electronic device.

In accordance with another aspect of the disclosure, the method may further include displaying the at least one first media and the at least one second media.

In accordance with another aspect of the disclosure, the capturing of the at least one first media of the at least one first ROI using the at least one first image sensor and the at least one second media of the at least one second ROI using the at least one second image sensor may include applying at least one effect on the at least one first ROI by the at least one first image sensor based on characteristics of the at least one first image sensor, applying at least one effect on the at least one second ROI by the at least one second image sensor based on characteristics of the at least one second image sensor, detecting an input for media content capture, and simultaneously capturing the at least one first media of the at least one first ROI with the applied at least one effect using the at least one first image sensor and the at least one second media of the at least one second ROI with the applied at least one effect using the at least one second image sensor.

In accordance with another aspect of the disclosure, the detecting of the plurality of ROIs in a preview frame, captured in the field of view of the plurality of image sensors of the electronic device may include detecting at least one of a scene and an object based on characteristics of the preview frame, and detecting the plurality of ROIs in the preview frame based on the detected at least one of the scene and the object.

In accordance with another aspect of the disclosure, the assigning of the at least one first ROI from the plurality of ROIs to at least one first image sensor from the plurality of image sensors and the at least one second ROI from the plurality of ROIs to at least one second image sensor from the plurality of image sensors may further include determining at least one selection parameter based on at least one of a scene and an object in the at least one ROI, mapping the at least one selection parameter to at least one characteristic of at least one image sensor of the plurality of image sensors, and assigning the at least one first ROI from the plurality of ROIs to at least one first image sensor from the plurality of image sensors and the at least one second ROI from the plurality of ROIs to at least one second image sensor from the plurality of image sensors.

In accordance with another aspect of the disclosure, the at least one selection parameter may include at least one of a selection parameter for luminance of the at least one scene, a selection parameter for motion tracking of the at least one object, a selection parameter for depth of the at least one object, a selection parameter for distance of the at least one object in the at least one media frame, or a selection parameter for external lighting conditions.

In accordance with another aspect of the disclosure, the at least one effect may include at least one of a wide view effect, a lossless zoom effect, a motion effect, a luminance effect, a focus effect, or a depth effect.

In accordance with another aspect of the disclosure, the at least one effect to be applied on the at least one first ROI, and the at least one effect to be applied on the at least one second ROI, may be selected by a user.

In accordance with another aspect of the disclosure, an electronic device for capturing ROI is provided. The electronic device includes a plurality of image sensors, a memory, and a processor operatively coupled with the memory and the plurality of image sensors. The processor is configured for detecting a plurality of ROIs in a preview frame, captured by and in a field of view of, the plurality of image sensors. Further, the processor is configured for assigning at least one first ROI from the plurality of ROIs to at least one first image sensor from the plurality of image sensors and at least one second ROI from the plurality of ROIs to at least one second image sensor from the plurality of image sensors. Further, the processor is configured for capturing at least one first media content of the at least one first ROI using the at least one first image sensor and at least one second media content of the at least one second ROI using the at least one second image sensor. Further, the processor is configured for storing the at least one first media content and the at least one second media content in the memory.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 1, 6, 7, and 8 are example scenarios in which an electronic device generates a hybrid media using a plurality of image sensors, according to various embodiments of the disclosure;

FIGS. 4 and 5 are flow diagrams illustrating various operations for generating the hybrid media using the plurality of image sensors, according to various embodiments of the disclosure;

FIGS. 9A and 9B are example illustrations for combining corresponding values of different sensors as received from the sensors in a processing buffer according to various embodiments of the disclosure;

FIG. 10 is an example illustration of ROI selection parameters, according to an embodiment of the disclosure; and FIG. 11 is an example illustration of ROI selection parameters along with the exposure values, according to an embodiment of the disclosure.

Throughout the drawings, like reference numerals will be understood to refer to like parts, components, and structures.

DETAILED DESCRIPTION

Figure 2:
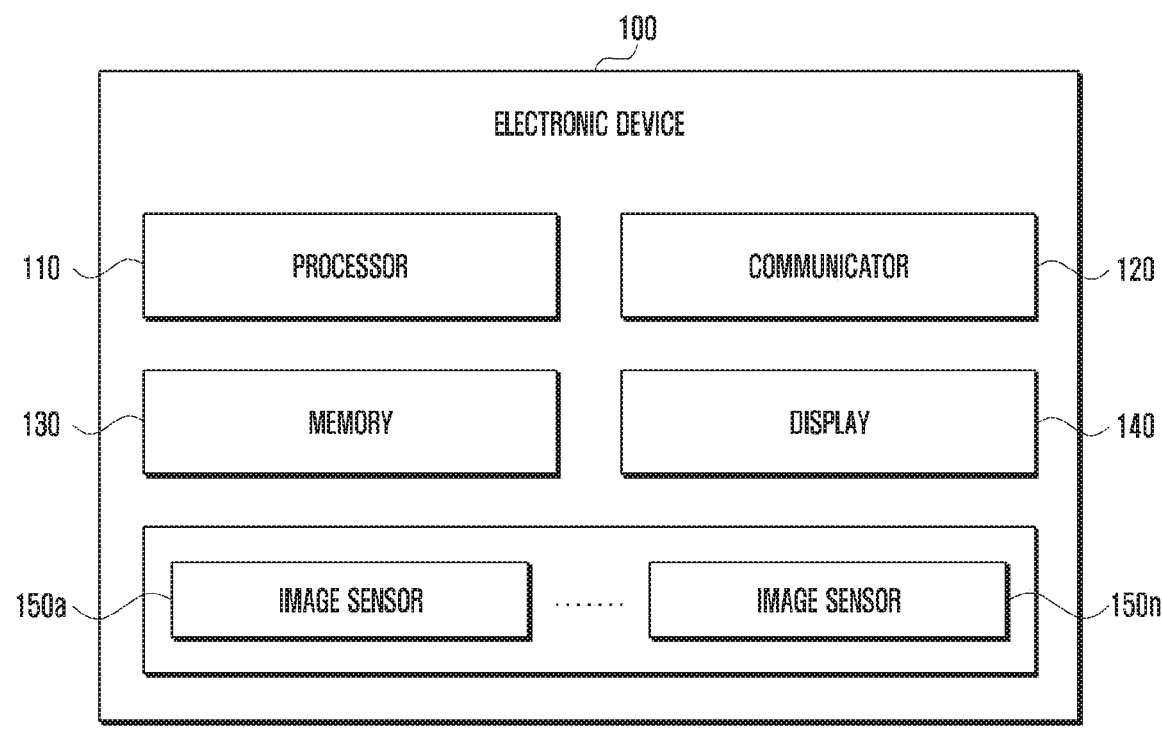
FIG. 2 illustrates various hardware components of the electronic device for generating the hybrid media using the plurality of image sensors, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

The terms "camera" and "image sensor" may be recited interchangeably herein.

Accordingly, embodiments herein achieve a method for capturing region of interest (ROI). The method includes detecting a plurality of ROI in a preview frame displayed in a field of view of at least one image sensor of the electronic device. Further, the method includes assigning at least one ROI from the plurality of ROIs to the at least one image sensor from a plurality of image sensors. Further, the method includes applying at least one effect on the at least one ROI by the at least one assigned image sensor based on characteristics of the at least one image sensor. Further, the method includes capturing one or more media of the at least one ROI using the at least one image sensor with the applied effect. Further, the method includes storing the one or more media in the electronic device.

Unlike methods and system of the related art, the proposed method can be used to assist the user to perform multi-tasking while capturing multimedia content even in the presence of multiple cameras. This results in effectively utilizing the effect of multiple cameras in an enhanced manner.

In the proposed methods, the electronic device buffers one or more images of a scene and does scene analysis to identify one or more portions (e.g., one or more ROIs or the like) of interest of a user. Based on the identified ROI, an appropriate image sensor (e.g., camera or the like) is selected to apply an effect on that portion (i.e., ROI) only and store multiple multi-media content that are captured simultaneously (for the one or more ROIs). This has a significant impact on user experience since the user would be able to capture multiple images simultaneously with each being with different effects including different file formats such as GIF/video/image at same time. This enables multi-tasking in the image sensor performance and maximizes the utilization of available multiple image sensors.

The electronic device comprises multiple image sensors or multiple camera devices individually operating together, buffers a common field of view (FOV), wherein the processor perform scene analysis to identify portions of interest of the user in the FOV and the image sensor from multiple sensors is identified/selected to apply a special effect on the identified portion only and to store it with single capture input. This results in enhancing the user experience.

The electronic device analyzes the scene while capturing an image and classifies the objects in the scene. Further, the electronic device identifies the characteristics of the objects and maps the object characteristics with camera capabilities. Further, the electronic device selects one or more cameras based on the mapping and applies the effect to different ROIs using the one or more cameras. The electronic device generates a hybrid media content from the one or more selected cameras. This results in providing different viewing experiences for the user.

The method utilizes a single viewfinder for multiple image sensors. The method can be used to determine the one or more ROIs from a media frame based on a scene identification. Further, the method can be used to associate the image sensors as per their capabilities based on the analysis of the one or more ROIs. Further, the method can be used to apply the effects on the one or more ROI so that the media content can be captured by an associated image sensor with that effect. Further, the method can be used to simultaneously store multiple media files captured from multiple cameras in different file formats based on a single input for capturing an image.

The method can be used to analyze the scene and intelligently detect the cameras with respect to the objects in the scene and camera characteristics. In the proposed method, a single click on the electronic device can preserve the multiple images captured from multiple cameras in different formats.

The one or more ROIs selected by the user are identified based on automatic scene analysis/manual by the user so that the user can capture multiple images based on a single input for capturing an image. The method can be used to select a best image sensor from the plurality of sensors, which may play a significant role in determining the quality of the image. The user added effects will be applied to the ROI and will be captured by corresponding image sensors which are assigned for that ROI. This enhances the user experience as the user will get an enhanced image with added effects. This may have a significant effect in the user experience as the user is able to capture multiple images simultaneously with each being with different effects including different file formats (e.g., GIF/video/image) at substantially the same time. This enables high degree of multi-tasking in camera performance and justifies utilization of multiple image sensors.

The method can be used to utilize optical characteristics of sensors for the defined ROI only and apply image processing for that portion for generating ROI with effects.

Referring now to the drawings, and more particularly to FIGS. 1 through 8 according to various embodiments of the disclosure.

FIGS. 1, 6, 7, and 8 are example scenarios in which an electronic device (100) generates a hybrid media using a plurality of image sensors, according to various embodiments of the disclosure. The electronic device (100) can be, for example, but not limited to a cellular phone, a smart phone, a Personal Digital Assistant (PDA), a tablet computer, a laptop computer, an Internet of Things (IoT), a smart watch, a virtual reality device, a multiple camera system or the like. The image sensor can be, for example, but not limited to a main camera, an ultra wide camera, a telephoto camera, a depth camera, a wide camera or the like.

The electronic device (100) is configured to detect a plurality of ROI in a preview frame displayed in a field of view of at least one image sensor from the plurality of image sensors. In an embodiment, the electronic device (100) is configured to detect at least one of a scene and an object based on characteristics of the preview frame and detect the plurality of ROIs in the preview frame based on at least one of the scene and the object.

Further, the electronic device (100) is configured to assign at least one ROI from the plurality of ROIs to the at least one image sensor from the plurality of image sensors. In an embodiment, the electronic device (100) is configured to determine at least one selection parameter based on at least one of the scene and the object in the at least one ROI, map the at least one selection parameter to at least one characteristic of at least one image sensor of the plurality of image sensors, and assign the at least one ROI to the at least one image sensor of the plurality of image sensors. In an embodiment, the at least one selection parameter is indicative at least one of luminance of the at least one scene, motion tracking of the at least one object, depth of the at least one object, distance of the at least one object in the at least one media frame and external lighting conditions.

Further, the electronic device (100) is configured to apply at least one effect on the at least one ROI by the at least one assigned image sensor based on characteristics of the at least one image sensor. In an embodiment, the effect is at least one of a wide view, a lossless zoom, a motion, a luminance, a focus and a depth effect. In an embodiment, the at least one effect to be applied on the at least one ROI is selected by a user.

Further, the electronic device (100) is configured to capture one or more media of the at least one ROI using the at least one image sensor with the applied effect. In an embodiment, one or more media of the at least one ROI is captured using the at least one image sensor by detecting an input for media content capture, and simultaneously capturing the first media of the at least one ROI using the at least one image sensor and the second media of the plurality of ROIs using the at least one image sensor. Further, the electronic device (100) is configured to store the one or more media and displays the one or more stored media.

In another embodiment, the electronic device (100) is configured to detect the plurality of ROI in the preview frame, captured by and in the field of view of, the plurality of image sensors. Further, the electronic device (100) is configured to assign the at least one first ROI from the plurality of ROIs to at least one first image sensor from the plurality of image sensors and at least one second ROI from the plurality of ROIs to at least one second image sensor from the plurality of image sensors. In an embodiment, the electronic device (100) is configured to determine at least one selection parameter based on at least one of a scene and an object in the at least one ROI, map the at least one selection parameter to at least one characteristic of at least one image sensor of the plurality of image sensors, and assign the at least one first ROI from the plurality of ROIs to at least one first image sensor from the plurality of image sensors and the at least one second ROI from the plurality of ROIs to at least one second image sensor from the plurality of image sensors.

Further, the electronic device (100) is configured to capture at least one first media of the at least one first ROI using the at least one first image sensor and at least one second media of the at least one second ROI using the at least one second image sensor. In an embodiment, the at least one first media of the at least one first ROI using the at least one first image sensor and at least one second media of the at least one second ROI is captured by applying at least one effect on the at least one first ROI by the at least one first image sensor based on characteristics of the at least one first image sensor, applying at least one effect on the at least one second ROI by the at least one second image sensor based on characteristics of the at least one second image sensor, detecting the shutter event, and simultaneously capturing the at least one first media of the at least one first ROI with the at least one applied effect using the at least one first image sensor and the at least one second media of the at least one second ROI with the at least one applied effect using the at least one second image sensor.

Referring to FIG. 1, the electronic device (100) detects the presence of multiple image sensors and captures the media frame using one or more image sensors. Further, the electronic device (100) determines ROIs from the media frame and analyzes the ROIs to select one or more image sensors. In an embodiment, the electronic device (100) previews the determined ROIs in a viewfinder to select the one or more image sensors. In an embodiment, the viewfinder may show all objects in the scene. In an embodiment, the viewfinder may show only a specific object in the scene based on the ROI. In an embodiment, the viewfinder may provide to the user one or more options corresponding to the plurality of image sensors. If the user of the electronic device (100) selects the first image sensor from the plurality of image sensors then, the viewfinder may show only a specific object correspond to the first image sensor. If the user of the electronic device (100) selects all the plurality of image sensors then, the viewfinder may show the specific object corresponding to all the plurality of image sensors in the display. Further, the electronic device (100) applies an effect on the ROIs using one or more image sensors. The electronic device (100) generates the media file with the applied effects and stores a media file with the applied effects. The electronic device (100) displays the media file with the applied effects. Referring to FIG. 1, the multiple media content from the same scene with different effects and file formats are depicted. The first content, third content, and fourth content are in jpeg format whereas the second content is in mp4 format. This results in enhancing the user experience.

In an embodiment, the electronic device (100) displays the first content of the media file with the applied effects. Once the user performs an input (e.g., a touch input, a hover or the like) on the first content, the electronic device (100) displays all four contents of the media file.

In an embodiment, the electronic device (100) displays the all contents of the media file with the applied effects in an individual manner, so that the user can select and view any content based on his/her interest.

Referring to FIG. 1, the multiple media content from the same scene with different effects and file formats are depicted. The first content, third content, and fourth content are in jpeg format whereas the second content is in mp4 format.

Figure 6:
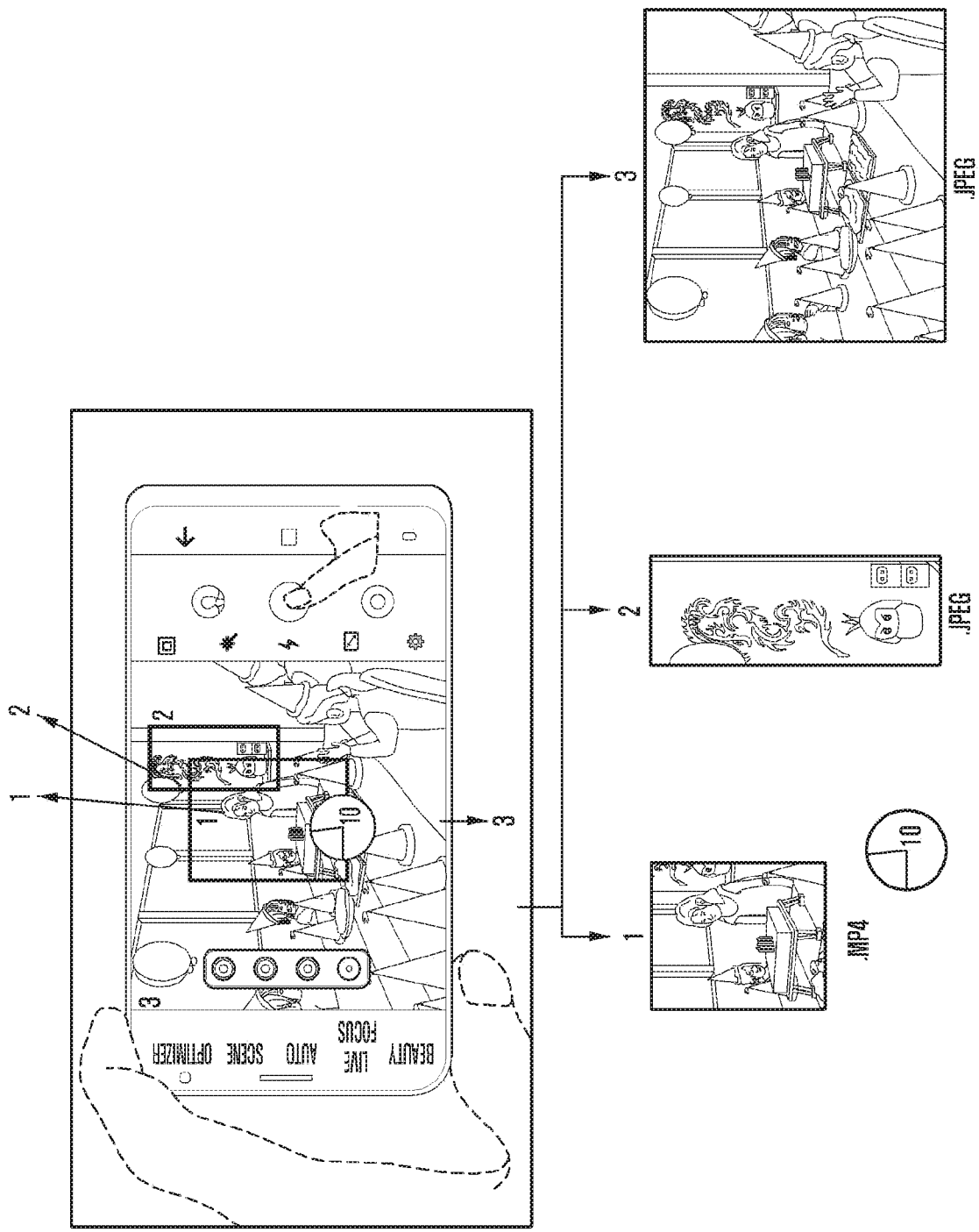
Figure 7:
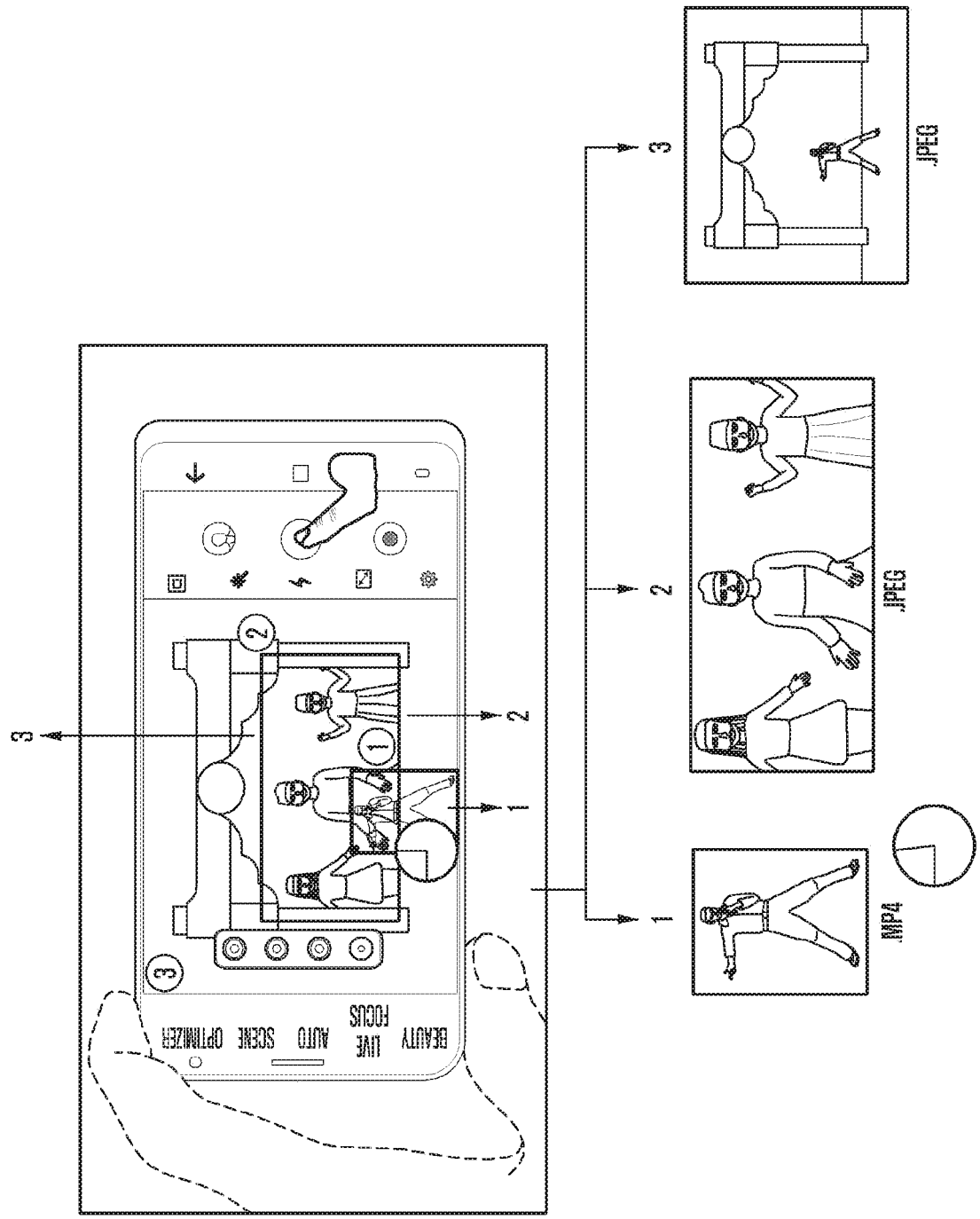

Referring to FIGS. 6 and 7, the hybrid media content is captured from multiple image sensors simultaneously in which the first content is in mp4 format and the second content and third content are in jpeg format. This results in enhancing the user experience.

Figure 8:
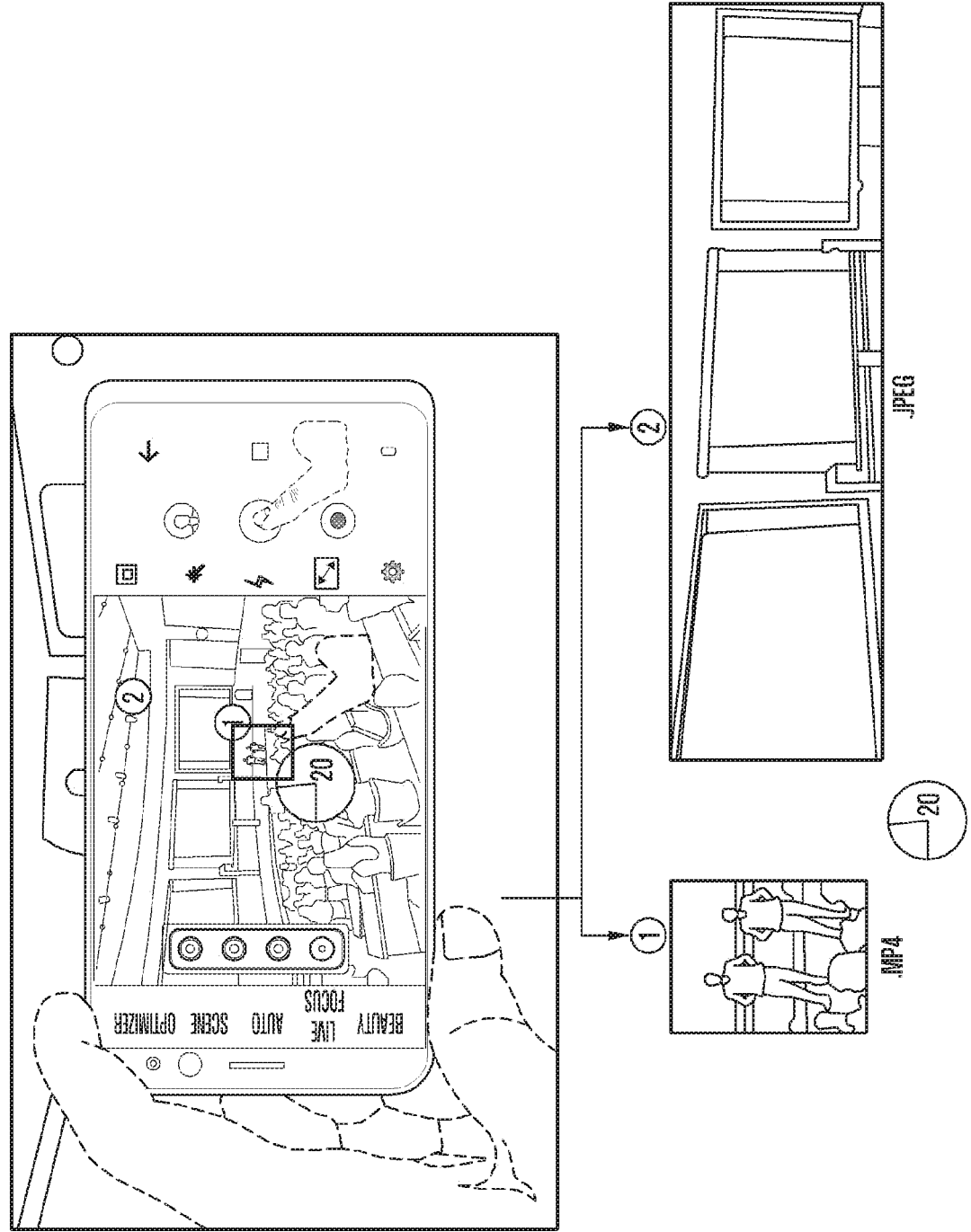

Referring to FIG. 8, the hybrid media content is captured from multiple image sensors simultaneously in which the first content is in mp4 format and the second content is in jpeg format. This results in enhancing the user experience.

In an example, Table 1 illustrates properties and utilization effects of various cameras.

TABLE 1

| Camera(s) | Properties | Utilization Effect |
| --- | --- | --- |
| Ultra wide camera | Large FOV from 77° Wide to 120° Ultra wide | Wide View |
| Telephoto camera | Digital Zoom/Optical Zoom ranging from 2x to 10x. Clear, sharp and lossless images even from a distance. | Lossless Zoom |
| Main camera | Dual Aperture for low light and bright daylight. Optical image stabilization (OIS). | Motion (Gif, mp4), Luminance, Focus |

TABLE 1-continued

| Camera(s) | Properties | Utilization Effect |
| --- | --- | --- |
| Depth camera | Works along with main camera (13) to adjust the depth of field. Used to create effects like Bokeh mode, Dolly effect, blurring out the background, etc. | Effects that relate to depth |

Figure 9A:
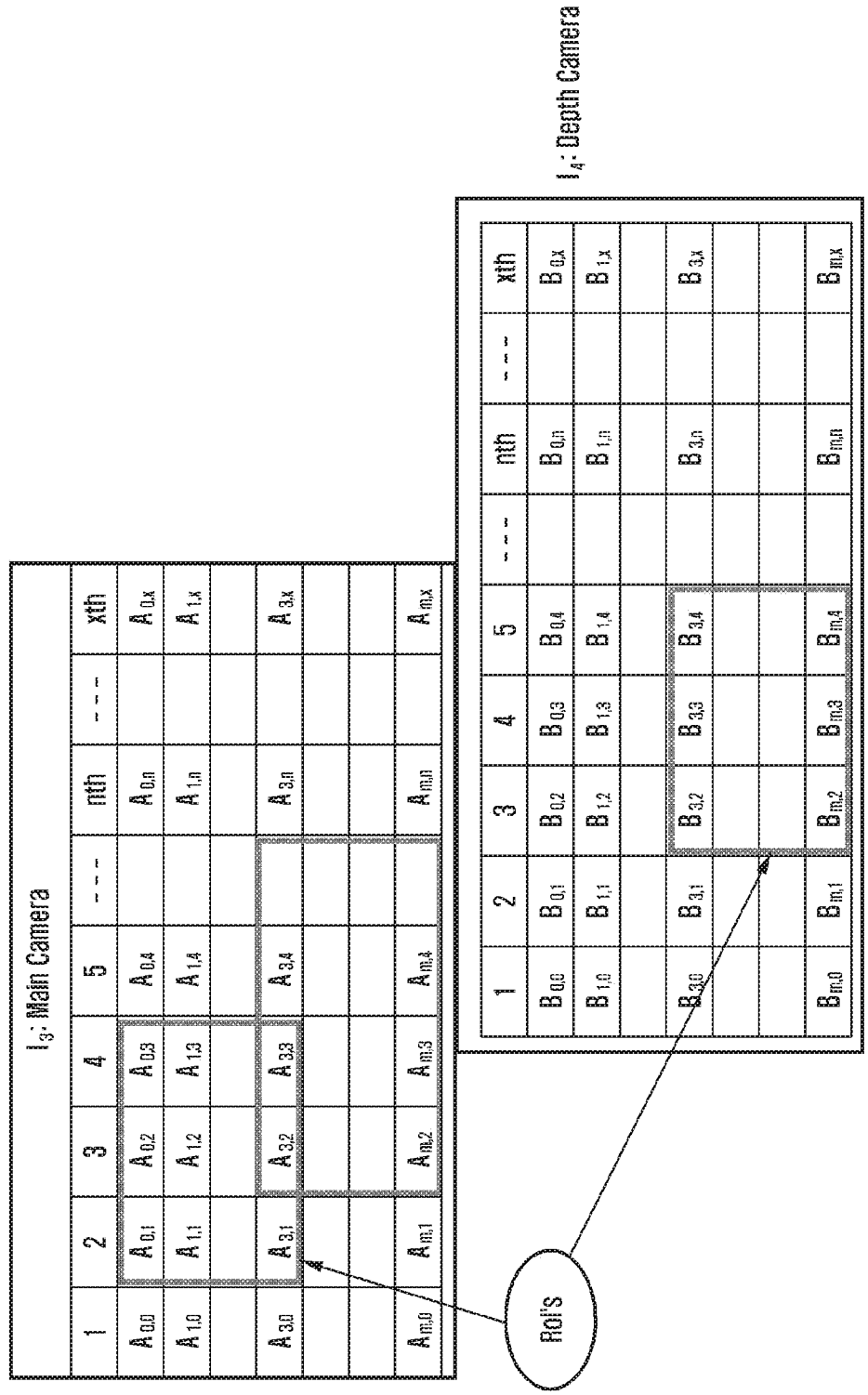

FIGS. 9A and 9B are example illustrations for combining corresponding values of different sensors as received from the sensors in a processing buffer. Consider, the FOV of $I_3$ is from $A_{0,0}$ to $A_{m,x}$, however the identified ROIs are $A_{0,1}$ to $A_{3,3}$ and $A_{3,2}$ to $A_{m,4}$ which is the subset of FOV of $I_3$. Thus, $I_3$ will focus on these ROIs only. This information is passed to a stream combination engine for further processing. The stream combination engine generates the hybrid media based on identified ROIs and combines the information of different cameras using the hybrid media generator, if different cameras have same ROIs, using a combiner function.

$$f(I_1, I_2, I_3, I_4) = \sum_{n=1}^{n=4} RoI_n(I_1, I_2, I_3, I_4)$$

The array shown in the FIGS. 9A and 9B are the values (e.g., $A_{0,0}$ to $A_{m,x}$) of the scene on the preview FOV of one of the image sensors. These values are generated based on the standard algorithm to convert the scene in the RGB (or YUV) values. The ROIs (e.g., $A_{0,1}$ to $A_{3,3}$ and $A_{3,2}$ to $A_{m,4}$) are selected from the FOV. The processor passes the information of the ROI location (e.g., $A_{m,x}$ or $B_{m,x}$) to the image sensors. The image sensor then sends only the values of ROI as collected from the preview FOV to a processing buffer (i.e., stream combination engine). The stream combination engine combines the corresponding values of different sensors (e.g., $A_{3,2}$ to $A_{m,4}$ and $B_{3,2}$ to $B_{m,4}$) as received from the sensors in the processing buffer. The memory stores the value of final output (i.e., hybrid media content) after merging the corresponding values of different sensors.

FIG. 10 is an example illustration of ROI selection parameters, according to an embodiment of the disclosure.

Referring to FIG. 10, the electronic device (100) utilizes the ROI selection parameters of FIG. 10 to set the value of LV as either 1 or 0.

The threshold in this case would be around the average value (~12).

Value of LV is 0 if the threshold value is less than to 12.

Value of LV is 1 if the threshold value is greater than or equal to 12.

Similarly, a threshold for MV can be derived using motion tracking techniques.

If the object is static the value of MV is 0.

If the object is in motion the value of MV is 1.

Similarly, a threshold for DV can be derived using depth value of the object from the image sensor.

The electronic device identifies the farthest and nearest objects distance from the image sensor.

The threshold is calculated by taking the average value of the farthest and nearest objects.

If the object is nearer than the average distance the value of DV is 0.

If the object is farther than the average distance the value of DV is 1.

FIG. 11 is an example illustration of ROI selection parameters along with the exposure values, according to an embodiment of the disclosure.

In the disclosure, the example values and functions in Table 1, FIG. 9A, 9B, or 10 are provided for the sake of clarity and understanding, but the values of the image sensor and the functions of the image sensor may be varied and modified based on the requirement of the user or manufacturer.

Although FIG. 1 shows an overview of the electronic device (100), it is to be understood that other embodiments are not limited thereto. In other embodiments, the electronic device (100) may include a greater or lesser number of components. Further, the labels or names of the components are used only for illustrative purposes and does not limit the scope of the disclosure.

FIG. 2 illustrates various hardware components of the electronic device (100) for generating the hybrid media using the plurality of image sensors (150a-150n), according to an embodiment as disclosed herein. In an embodiment, the electronic device (100) includes a processor (110), a communicator (120), a memory (130), a display (140) and the plurality of image sensors (150a-150n). The processor (110) is coupled with the communicator (120), the memory (130), the display (140) and the plurality of image sensors (150a-150n).

In an embodiment, the processor (110) is configured to detect the plurality of ROI in the preview frame, captured by and in the field of view of, the at least one image sensor. In an embodiment, the processor (110) is configured to detect at least one of a scene and an object based on characteristics of the preview frame and detect the plurality of ROIs in the preview frame based on at least one of the scene and the object.

Further, the processor (110) is configured to assign at least one ROI from the plurality of ROIs to the at least one image sensor from the plurality of image sensors (150a-150n). In an embodiment, the processor (110) is configured to determine at least one selection parameter based on at least one of the scene and the object in the at least one ROI, map the at least one selection parameter to at least one characteristic of at least one image sensor of the plurality of image sensors (150a-150n), and assign the at least one ROI to the at least one image sensor of the plurality of image sensors (150a-150n).

Further, the processor (110) is configured to apply at least one effect on the at least one ROI by the at least one assigned image sensor based on characteristics of the at least one image sensor.

Further, the processor (110) is configured to capture one or more media of the at least one ROI using the at least one image sensor with the applied effect. In an embodiment, one or more media of the at least one ROI is captured using the at least one image sensor by detecting an input for media content capture, and simultaneously capturing the first media of the at least one ROI using the at least one image sensor and the second media of the plurality of ROIs using the at least one image sensor.

Further, the memory (130) is configured to store the one or more media. Further, the display (140) displays the one or more stored media.

In another embodiment, the processor (110) is configured to detect the plurality of ROI in the preview frame, captured by and in the field of view of, the plurality of image sensors (150a-150n). Further, the processor (110) is configured to assign the at least one first ROI from the plurality of ROIs to at least one first image sensor from the plurality of image sensors (150a-150n) and at least one second ROI from the plurality of ROIs to at least one second image sensor from the plurality of image sensors (150a-150n). In an embodiment, the processor (110) is configured to determine at least one selection parameter based on at least one of a scene and an object in the at least one ROI, map the at least one selection parameter to at least one characteristic of at least one image sensor of the plurality of image sensors (150a-150n), and assign the at least one first ROI from the plurality of ROIs to at least one first image sensor from the plurality of image sensors (150a-150n) and the at least one second ROI from the plurality of ROIs to at least one second image sensor from the plurality of image sensors (150a-150n).

Further, the processor (110) is configured to capture at least one first media of the at least one first ROI using the at least one first image sensor and at least one second media of the at least one second ROI using the at least one second image sensor. In an embodiment, the at least one first media of the at least one first ROI using the at least one first image sensor and at least one second media of the at least one second ROI is captured by applying at least one effect on the at least one first ROI by the at least one first image sensor based on characteristics of the at least one first image sensor, applying at least one effect on the at least one second ROI by the at least one second image sensor based on characteristics of the at least one second image sensor, detecting the shutter event, and simultaneously capturing the at least one first media of the at least one first ROI with the at least one applied effect using the at least one first image sensor and the at least one second media of the at least one second ROI with the at least one applied effect using the at least one second image sensor.

The processor (110) is configured to execute instructions stored in the memory (130) and to perform various processes. The communicator (120) is configured for communicating internally between internal hardware components and with external devices via one or more networks.

The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In some examples, the memory (130) can be configured to store larger amounts of information than the memory. In certain examples, a non-transitory storage medium may store data that can, over time, change (e.g., in Random Access Memory (RAM) or cache).

Although the FIG. 2 shows various hardware components of the electronic device (100) but it is to be understood that other embodiments are not limited thereto. In other embodiments, the electronic device (100) may include a greater or lesser number of components. Further, the labels or names of the components are used only for illustrative purposes and does not limit the scope of the disclosure. One or more components can be combined together to perform the same or substantially similar functions to capture the ROIs in the electronic device (100).

Figure 3A:
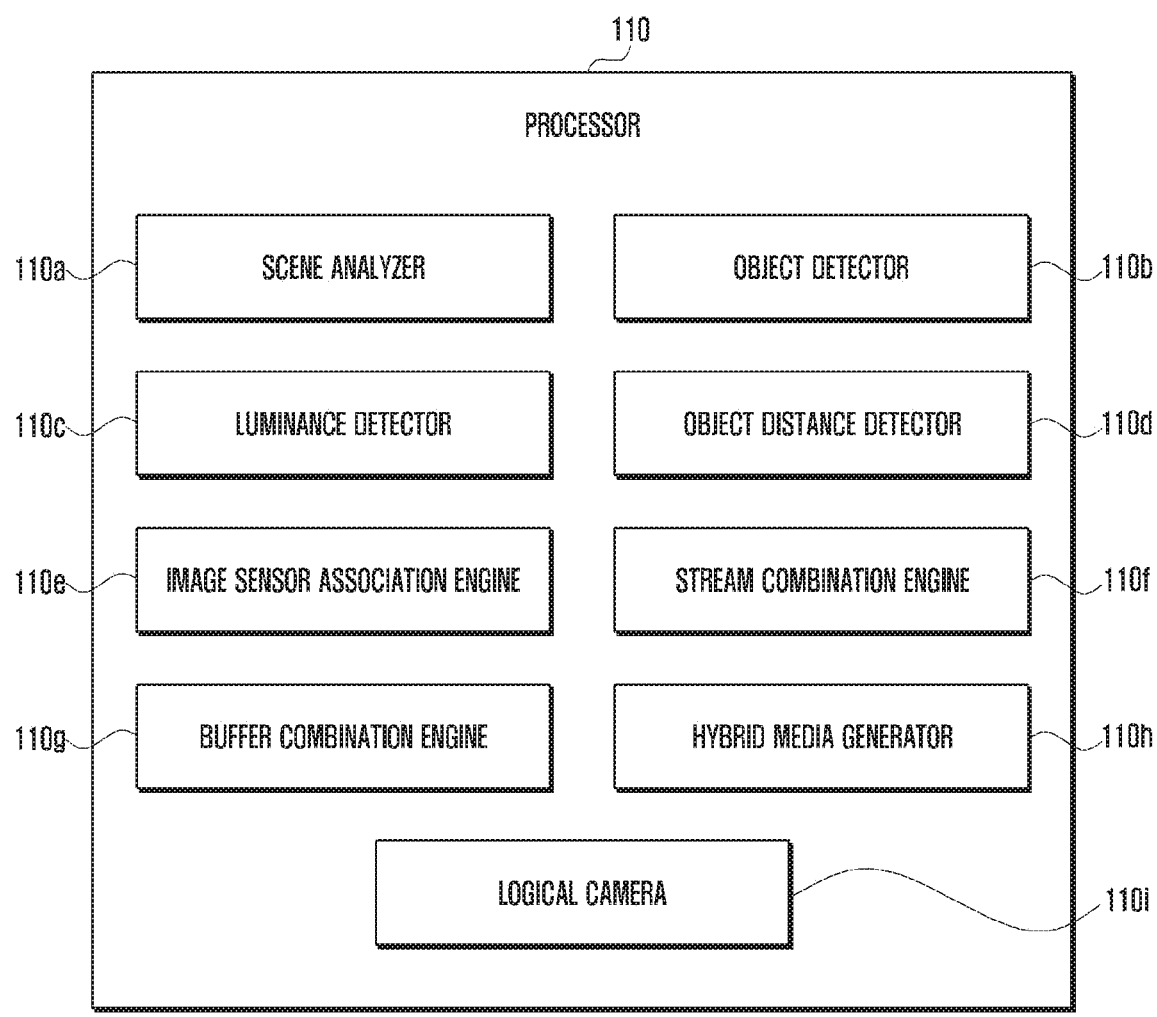
FIG. 3A illustrates various hardware components of a processor included in the electronic device, according to an embodiment of the disclosure.

FIG. 3A illustrates various hardware components of the processor (110) included in the electronic device (100), according to an embodiment as disclosed herein. In an embodiment, the processor (110) includes a scene analyzer (110a), an object detector (110b), a luminance detector (110c), an object distance detector (110d), an image sensor association engine (110e), a stream combination engine (110f), a buffer combination engine (110g), a hybrid media generator (110h) and a logical camera (110i). The scene analyzer (110a) performs the scene analysis to identify portions of user's interest in the FOV. The scene analysis and object analysis are performed based on methods of the related art.

In an embodiment, the hybrid media generator (110h) is configured to detect the plurality of ROI in the preview frame, captured by and in the field of view of, the at least one image sensor. In an embodiment, the hybrid media generator (110h) is configured to detect at least one of a scene and an object based on characteristics of the preview frame and detect the plurality of ROIs in the preview frame based on at least one of the scene and the object using the scene analyzer (110a) and the object detector (110b). The luminance detector (110c) detects the luminance value in the scene and the object distance detector (110d) detects the distance between the object in the scene.

Further, the hybrid media generator (110h) is configured to assign at least one ROI from the plurality of ROIs to the at least one image sensor from the plurality of image sensors (150a-150n). Further, the hybrid media generator (110h) is configured to apply at least one effect on the at least one ROI by the at least one assigned image sensor based on characteristics of the at least one image sensor using the image sensor association engine (110e).

Further, the hybrid media generator (110h) is configured to capture one or more media of the at least one ROI using the at least one image sensor with the applied effect.

In another embodiment, the hybrid media generator (110h) is configured to detect the plurality of ROI in the preview frame, captured by and in the field of view of, the plurality of image sensors (150a-150n). Further, the hybrid media generator (110h) is configured to assign the at least one first ROI from the plurality of ROIs to at least one first image sensor from the plurality of image sensors (150a-150n) and at least one second ROI from the plurality of ROIs to at least one second image sensor from the plurality of image sensors (150a-150n) using the image sensor association engine (110e), the stream combination engine (1100, and the buffer combination engine (110g). Further, the hybrid media generator (110h) is configured to capture at least one first media of the at least one first ROI using the at least one first image sensor and at least one second media of the at least one second ROI using the at least one second image sensor.

The buffer combination engine (110g) collects the buffer value from various image sensors via a buffer combination engine and generates hybrid media content. This content is sent to an application layer for display or storage. The stream combination engine (1100 identifies the corresponding pixel values from various image sensors using the identified ROI. The stream combination engine (1100 is a function of summation of pixel values of various image sensors for a particular ROI. The buffer combination engine combines the stream of various image sensor in a buffer which acts as a virtual buffer for the camera application as shown in the FIG. 3E. The FIG. 3E illustrates the hybrid media creation logic.

In an embodiment, the logical camera (110i) receives various streams related to the captured scene from the plurality of image sensors (150a-150n). The logical camera (110i) stores the various streams related to the captured scene and produces an output corresponding to the stream.

Although the FIG. 3A shows various hardware components of the processor (110), it is to be understood that other embodiments are not limited thereto. In other embodiments, the processor (110) may include a greater or lesser number of components. Further, the labels or names of the components are used only for illustrative purpose and do not limit the scope of the disclosure. One or more components can be combined together to perform the same or substantially similar function to capture ROI in the electronic device (100).

Figure 3B:
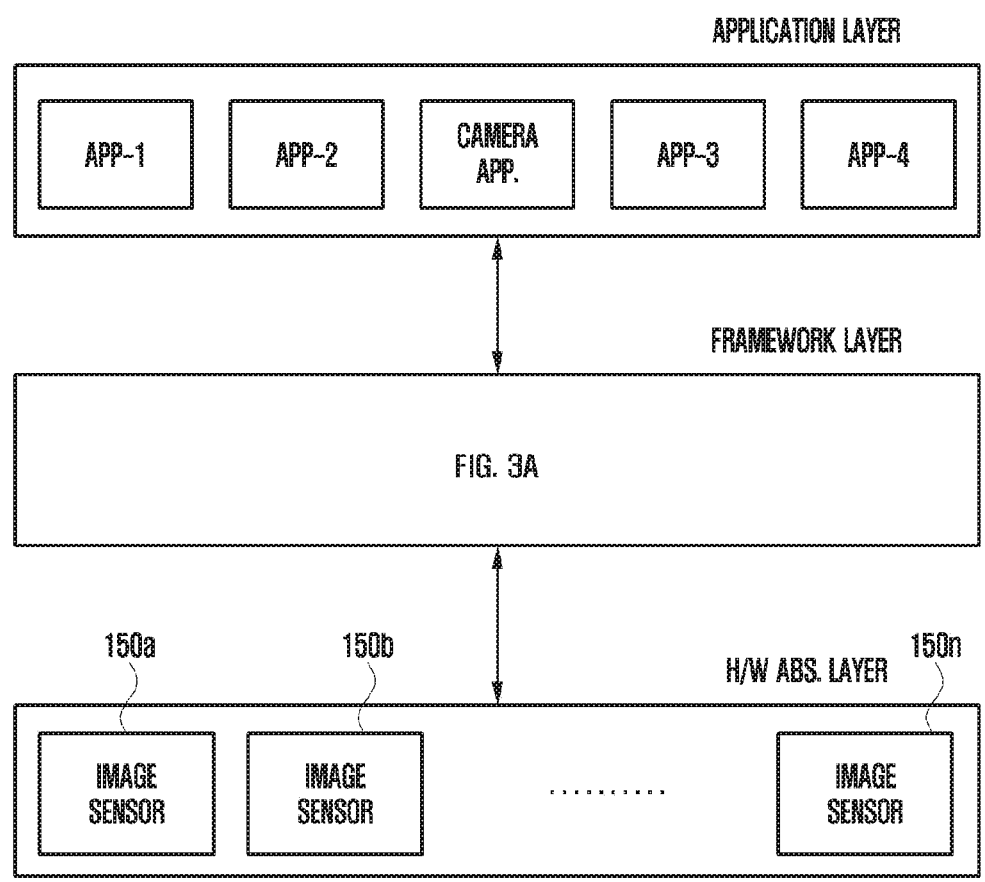
FIG. 3B shows various hardware components of the electronic device from layer level representation, according to an embodiment of the disclosure.

FIG. 3B shows various hardware components of the electronic device (100) from layer level representation, according to an embodiment as disclosed herein. In an embodiment, the electronic device (100) includes an application layer, a framework layer, and hardware abstraction layer. The application layer includes various application (e.g., camera related application, photo editing application, a photo sharing application, a social networking application or the like). The framework layer is communicated with the application layer and the hardware abstraction layer. The framework layer includes various hardware components as disclosed in the FIG. 3A. The hardware abstraction layer includes the plurality of image sensors (150a-150n).

Figure 3C:
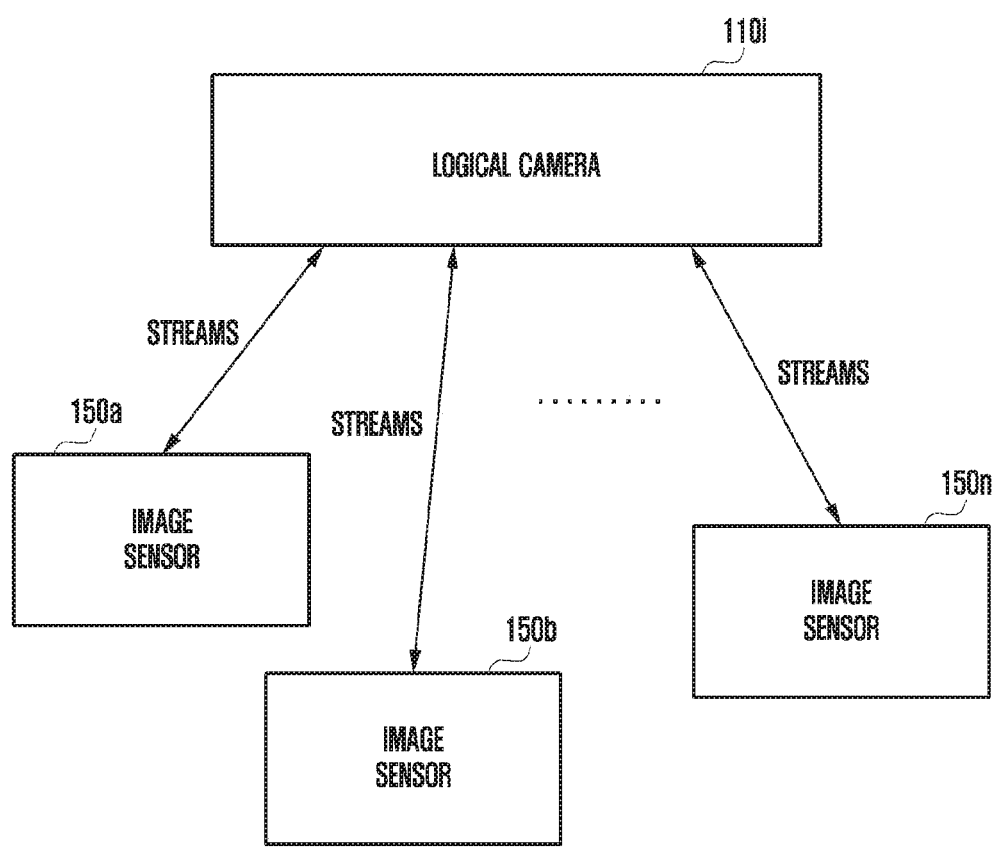
FIG. 3C illustrates an operation between a logical camera and the plurality of image sensors, according to an embodiment of the disclosure.

FIG. 3C illustrates an operation between the logical camera (110i) and the plurality of image sensors (150a-150n), according to an embodiment as disclosed herein. In an embodiment, the logical camera (110i) receives various streams related to the captured scene from the plurality of image sensors (150a-150n). The logical camera (110i) stores the various streams related to the captured scene and produces an output corresponding to the stream.

Figure 3D:
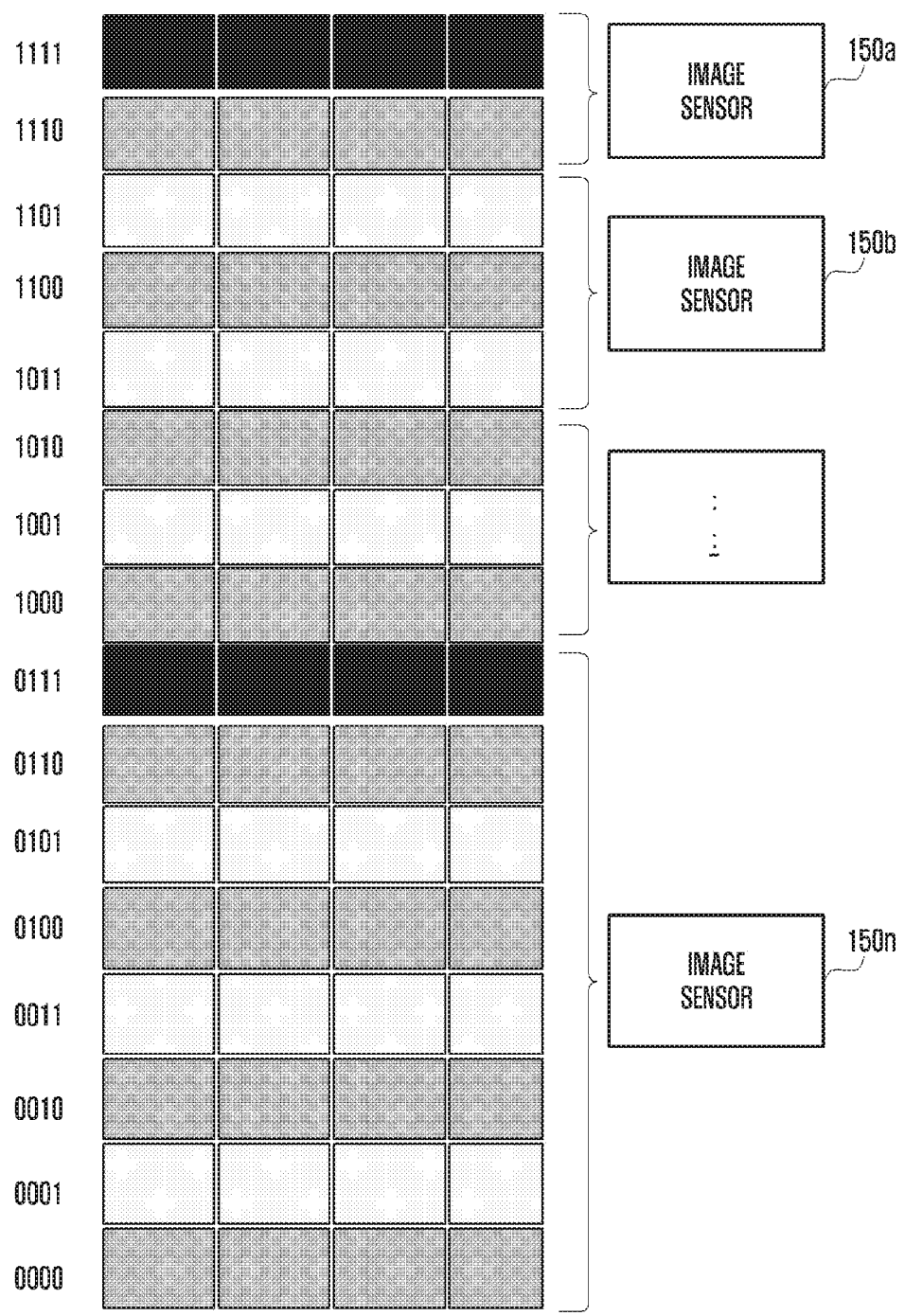
FIG. 3D illustrates combined buffer by the plurality of image sensors, according to an embodiment of the disclosure.
Figure 3E:
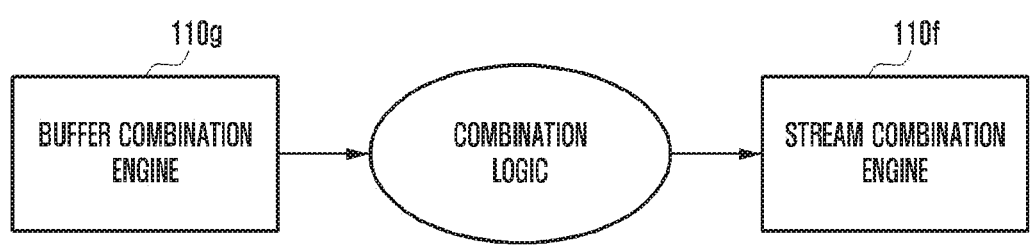
FIG. 3E illustrates a hybrid media creation logic, according to an embodiment of the disclosure.

FIG. 3D illustrates a combined buffer by the plurality of image sensors (150a-150n), according to an embodiment as disclosed herein. The various streams related to the captured scene is stored in the buffer.

Figure 5:
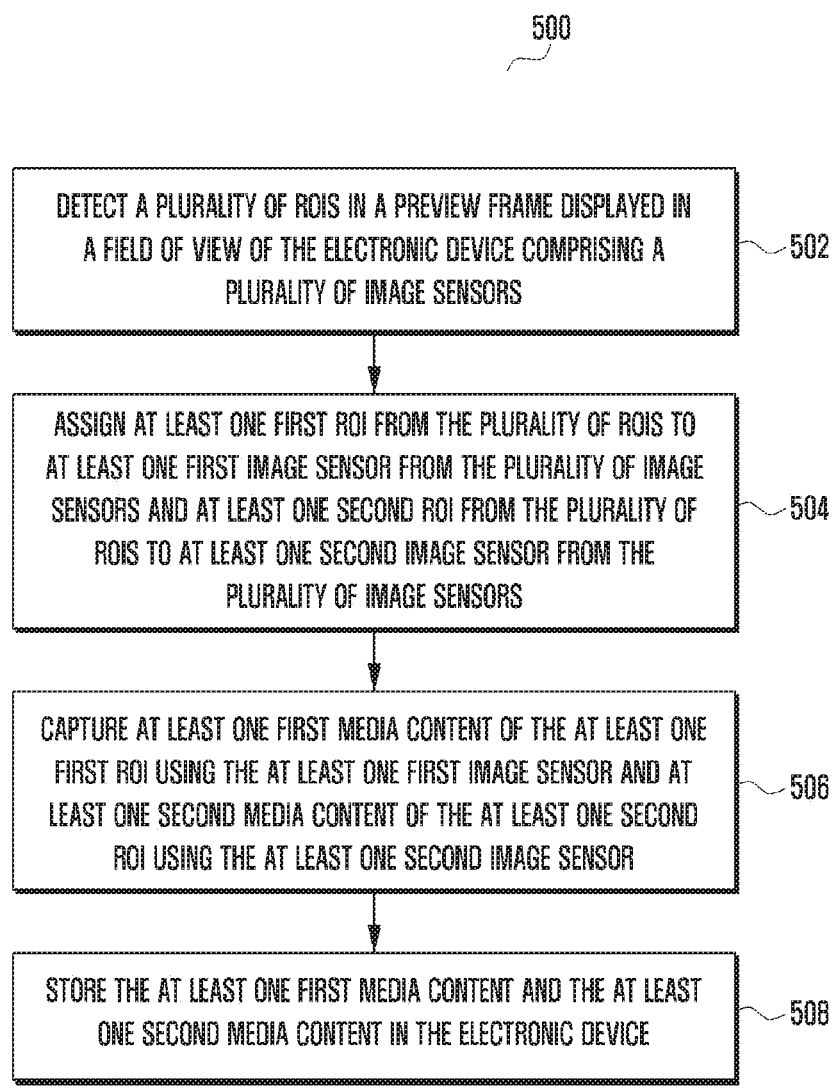

FIGS. 4 and 5 are flow diagrams (400 and 500) illustrating various operations for generating the hybrid media using the plurality of image sensors (150a-150n), according to various embodiments of the disclosure.

Referring to FIG. 4, the operations (402-410) are performed by the processor (110). At operation 402, the method includes detecting the plurality of ROI in the preview frame, captured by and in the field of view of, at least one image sensor. At operation 404, the method includes assigning the at least one ROI from the plurality of ROIs to the at least one image sensor from the plurality of image sensors (150a-150n). At operation 406, the method includes applying the at least one effect on the at least one ROI by the at least one assigned image sensor based on characteristics of the at least one image sensor. At operation 408, the method includes capturing one or more media of the at least one ROI using the at least one image sensor with the applied effect. At 410, the method includes storing the one or more media in the electronic device (100).

Referring to FIG. 5, the operations (502-508) are performed by the processor (110). At operation 502, the method includes detecting the plurality of ROI in the preview frame, captured by and in the field of view of, the electronic device (100) comprising the plurality of image sensors (150a-150n). At operation 504, the method includes assigning the at least one first ROI from the plurality of ROIs to at least one first image sensor from the plurality of image sensors (150a-150n) and at least one second ROI from the plurality of ROIs to at least one second image sensor from the plurality of image sensors (150a-150n). At operation 506, the method includes capturing at least one first media of the at least one first ROI using the at least one first image sensor and at least one second media of the at least one second ROI using the at least one second image sensor. At operation 508, the method includes storing the at least one first media and the at least one second media in the electronic device.

The various actions, acts, blocks, operations, or the like in the flow diagrams (400 and 500) may be performed in the order presented, in a different order or simultaneously. Further, in some embodiments, some of the actions, acts, blocks, operations, or the like may be omitted, added, modified, skipped, or the like without departing from the scope of the disclosure.

The embodiments disclosed herein can be implemented using at least one software program running on at least one hardware device and performing network management functions to control the elements.

While the disclosure has been shown and described with reference to various embodiments thereof, it will be understood by those skilled in the art that various changes in form and details may be made therein without departing from the spirit and scope of the disclosure as described by the appended claims and their equivalents.

What is claimed is:

1. A method for capturing a region of interest (ROI) by an electronic device, the method comprising:
    detecting at least one of a scene and an object based on characteristics of a preview frame, captured in a field of view of a plurality of image sensors of the electronic device;
    detecting a plurality of ROIs in the preview frame based on the detected at least one of the scene and the object;
    assigning at least one first ROI from the plurality of ROIs to at least one first image sensor from the plurality of image sensors and at least one second ROI from the plurality of ROIs to at least one second image sensor from the plurality of image sensors;
    applying at least one first effect on the at least one first ROI by the at least one first image sensor based on characteristics of the at least one first image sensor;
    applying at least one second effect on the at least one second ROI by the at least one second image sensor based on characteristics of the at least one second image sensor;
    detecting an input for media content capture;
    capturing at least one first media content of the at least one first ROI with the applied at least one first effect using the at least one first image sensor, and at least one second media content of the at least one second ROI with the applied at least one second effect using the at least one second image sensor; and
    storing the at least one first media content and the at least one second media content in the electronic device.

2. The method of claim 1, further comprising:
    displaying the at least one first media content and the at least one second media content.

3. The method of claim 1, wherein the assigning of the at least one first ROI from the plurality of ROIs to the at least one first image sensor from the plurality of image sensors and the at least one second ROI from the plurality of ROIs to the at least one second image sensor from the plurality of image sensors comprises:
    determining at least one selection parameter based on at least one of a scene and an object in the at least one ROI;
    mapping the at least one selection parameter to at least one characteristic of at least one image sensor of the plurality of image sensors; and
    assigning the at least one first ROI from the plurality of ROIs to at least one first image sensor from the plurality of image sensors and the at least one second ROI from the plurality of ROIs to at least one second image sensor from the plurality of image sensors.

4. The method of claim 3, wherein the at least one selection parameter includes at least one of a selection parameter for luminance of at least one scene, a selection parameter for motion tracking of at least one object, a selection parameter for depth of at least one object, a selection parameter for distance of at least one object in at least one media frame, or a selection parameter for external lighting conditions.

5. The method of claim 1, wherein the at least one first effect or the at least one second effect includes at least one of a wide view effect, a lossless zoom effect, a motion effect, a luminance effect, a focus effect, or a depth effect.

6. The method of claim 1, wherein the at least one first effect to be applied on the at least one first ROI and the at least one second effect to be applied on the at least one second ROI are selected by a user.

7. The method of claim 1, wherein the at least one first media content and the at least one second media content are captured using different file formats.

8. An electronic device for capturing a region of interest (ROI), the electronic device comprising:
    a plurality of image sensors;
    a memory; and
    a processor, operatively coupled with the memory and the plurality of image sensors, the processor being configured for:
        detecting at least one of a scene and an object based on characteristics of a preview frame, captured in a field of view of the plurality of image sensors,
        detecting a plurality of ROIs in the preview frame based on the detected at least one of the scene and the object,
        assigning at least one first ROI from the plurality of ROIs to at least one first image sensor from the plurality of image sensors and at least one second ROI from the plurality of ROIs to at least one second image sensor from the plurality of image sensors,
        applying at least one first effect on the at least one first ROI by the at least one first image sensor based on characteristics of the at least one first image sensor,
        applying at least one second effect on the at least one second ROI by the at least one second image sensor based on characteristics of the at least one second image sensor,
        detecting an input for media content capture,
        capturing at least one first media content of the at least one first ROI with the applied at least one first effect using the at least one first image sensor, and at least one second media content of the at least one second ROI with the applied at least one second effect using the at least one second image sensor, and
        storing the at least one first media content and the at least one second media content in the memory.

9. The electronic device of claim 8, wherein the processor is further configured for displaying the at least one first media content and the at least one second media content.

10. The electronic device of claim 8, wherein the processor, for the assigning of the at least one first ROI from the plurality of ROIs to the at least one first image sensor from the plurality of image sensors and the at least one second ROI from the plurality of ROIs to the at least one second image sensor from the plurality of image sensors, is further configured for:
- determining at least one selection parameter based on at least one of a scene and an object in the at least one ROI,
- mapping the at least one selection parameter to at least one characteristic of at least one image sensor of the plurality of image sensors, and
- assigning the at least one first ROI from the plurality of ROIs to at least one first image sensor from the plurality of image sensors and the at least one second ROI from the plurality of ROIs to at least one second image sensor from the plurality of image sensors.

11. The electronic device of claim 10, wherein the at least one selection parameter includes at least one of a selection parameter for luminance of at least one scene, a selection parameter for motion tracking of at least one object, a selection parameter for depth of at least one object, a selection parameter for distance of at least one object in at least one media frame, or a selection parameter for external lighting conditions.

12. The electronic device of claim 8, wherein the at least one first effect or the at least one second effect includes at least one of a wide view effect, a lossless zoom effect, a motion effect, a luminance effect, a focus effect, or a depth effect.

13. The electronic device of claim 8, wherein the at least one first effect to be applied on the at least one first ROI; and the at least one second effect to be applied on the at least one second are selected by a user.

14. The electronic device of claim 8, wherein the at least one first media content and the at least one second media content are captured using different file formats.

15. An electronic device for capturing a region of interest (ROI), the electronic device comprising:
- a plurality of image sensors;
- a memory; and
- a processor, operatively coupled with the memory and the plurality of image sensors, the processor being configured for:
  - detecting a plurality of ROIs in a preview frame, captured by and in a field of view of at least one image sensor from the plurality of image sensors,
  - assigning at least one ROI from the plurality of ROIs to the at least one image sensor from the plurality of image sensors,
  - applying at least one effect on the at least one ROI by the at least one image sensor based on characteristics of the at least one image sensor,
  - capturing one or more media content of the assigned at least one ROI using the at least one image sensor with the applied at least one effect, and
  - storing the one or more media content in the memory.

16. The electronic device of claim 15, wherein the processor, for the capturing of the one or more media content of the assigned at least one ROI using the at least one image sensor, is further configured for:
- detecting an input for media content capture, and
- simultaneously capturing a first media content of the assigned at least one ROI using the at least one image sensor and a second media content of the assigned at least one ROI using the at least one image sensor.

* * * * *